United States Patent
Avins

(10) Patent No.: US 8,887,884 B2
(45) Date of Patent: Nov. 18, 2014

(54) CLUTCH RETAINER SEALED TO COVER

(75) Inventor: David C. Avins, Burbank, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 407 days.

(21) Appl. No.: 13/313,162

(22) Filed: Dec. 7, 2011

(65) Prior Publication Data

US 2012/0152681 A1    Jun. 21, 2012

Related U.S. Application Data

(60) Provisional application No. 61/425,422, filed on Dec. 21, 2010.

(51) Int. Cl.
*F16H 45/02* (2006.01)

(52) U.S. Cl.
CPC .......... *F16H 45/02* (2013.01); *F16H 2045/021* (2013.01); *F16H 2045/0247* (2013.01); *F16H 2045/0278* (2013.01)
USPC ........................................ 192/3.3; 192/70.18

(58) Field of Classification Search
CPC .................. F16H 45/02; F16H 45/021; F16H 2045/0294; F16H 2045/0278; F16B 19/06; F16B 19/10; F16B 19/1027; F16B 43/001; F16B 33/004
USPC ......... 192/3.29, 3.3, 3.33, 70.1; 411/501, 542
See application file for complete search history.

(56) References Cited

U.S. PATENT DOCUMENTS

| | | | | |
|---|---|---|---|---|
| 3,763,978 | A * | 10/1973 | Crooks | 475/315 |
| 4,143,561 | A * | 3/1979 | Melhorn | 475/56 |
| 4,366,884 | A * | 1/1983 | Montalvo, Jr. | 188/71.3 |
| 5,964,329 | A | 10/1999 | Kawaguchi et al. | |
| 6,863,278 | B2 * | 3/2005 | Morvant | 277/602 |
| 8,051,964 | B2 * | 11/2011 | Olsen et al. | 192/3.3 |
| 2001/0011621 | A1 * | 8/2001 | Bauer et al. | 192/3.29 |
| 2007/0228668 | A1 * | 10/2007 | Dempsey et al. | 277/627 |
| 2007/0251788 | A1 | 11/2007 | Heck et al. | |
| 2008/0060895 | A1 | 3/2008 | Heck et al. | |
| 2008/0121484 | A1 | 5/2008 | Degler | |
| 2008/0149443 | A1 * | 6/2008 | Sickle | 192/3.29 |
| 2010/0084819 | A1 * | 4/2010 | Stehmeier et al. | 277/317 |

* cited by examiner

*Primary Examiner* — Edwin A Young
*Assistant Examiner* — Colby M Hansen
(74) *Attorney, Agent, or Firm* — Simpson & Simpson, PLLC

(57) ABSTRACT

An assembly for a torque converter including a first component, a second component non-rotatably secured to the first component by a connection member, wherein a seal is arranged between the first and second components, and the connect member extends through the seal, and wherein the seal is made from a cellulose-based material, wherein the first and second components at least partially define a first chamber and a second chamber, and wherein the seal separates the first chamber from the second chamber in a substantially fluid-tight seal manner.

3 Claims, 1 Drawing Sheet

CLUTCH RETAINER SEALED TO COVER

CROSS-REFERENCE TO RELATED APPLICATIONS

This application claims the benefit under 35 U.S.C. §119 (e) of U.S. Provisional Application No. 61/425,422 filed Dec. 21, 2010 which application is incorporated herein by reference.

FIELD OF THE INVENTION

The invention broadly relates to torque converters, more specifically to clutches in torque converters, and even more particularly to a fluid-tight seal for improved operation of a clutch in a torque converter.

BACKGROUND OF THE INVENTION

Torque converters are well known in the art. Some torque converters, such as torque converters having a so-called three-pass clutch lockup design, include a clutch plate retainer that is attached to the cover of the torque converter. The retainer carries and transfers torque to clutch plates. The attachment of such retainers in prior art torque converters involved welding the retainer to the cover or attaching the retainer without any special sealing element or process. For example, see U.S. Pat. No. 5,964,329 (Kawaguchi et al.) and United States Patent Publication 2007/0251788 (Heck et al.), which Patent and Patent Publication are hereby incorporated by reference in their entireties. Attaching the retainer to the cover without any additional sealing element enables leakage between the cover and clutch plate retainer and results in poor performance of the clutch, which relies on a pressure difference between two pressure chambers on opposite sides of the piston. Welding reliably forms a fluid-tight seal, but it is expensive and may warp or deform the cover, or create spatter or other contaminants that degrade the operation of the torque converter and are difficult to remove.

BRIEF SUMMARY OF THE INVENTION

The present invention broadly comprises an assembly for a torque converter including a first component, a second component non-rotatably secured to the first component by a connection member, wherein a seal is arranged between the first and second components, and the connect member extends through the seal, and wherein the seal is made from a cellulose-based material, wherein the first and second components at least partially define a first chamber and a second chamber, and wherein the seal separates the first chamber from the second chamber in a substantially fluid-tight seal manner.

In one embodiment, the seal is formed from friction material for a wet-running clutch. In one embodiment, the seal is impregnated by resin. In one embodiment, the first component is a cover for the torque converter and the second component is a retainer for carrying plates of a clutch. In one embodiment, the connection member is an extruded rivet. In one embodiment, the first and second chambers are formed on opposite sides of a piston of the torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
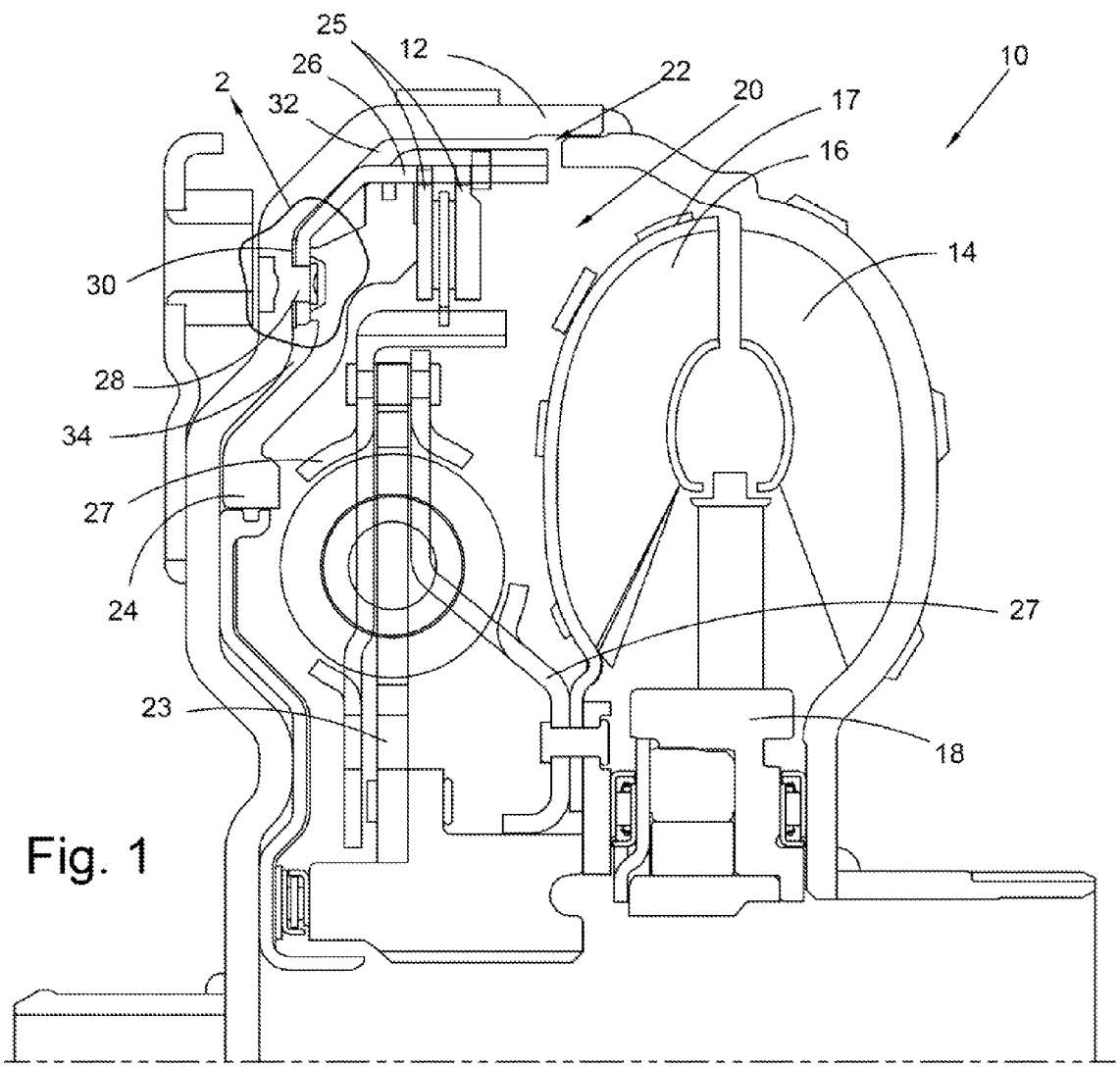
FIG. 1 is a cross-sectional view of a torque converter having a substantially fluid-tight seal formed between a cover and a clutch carrier; and, FIG. 2 is an enlarged view of the components forming the substantially fluid-tight seal.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims. It is also understood that any reference to axial or radial directions or properties is made with respect to the axis of rotation shown in the drawings, located generally along the bottom of FIG. 1.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Referring now to the figures, FIG. 1 shows torque converter 10 arranged, for example, with cover 12 connected to an engine or other torsional input (not shown), the torque converter also having impeller 14 connected to the cover, turbine 16 having shell 17, stator 18, and vibration damper 20 for hydraulically transferring torque through the torque converter. These components are shown for purposes of discussion, and could be replaced by any type or style of cover, impeller, turbine, stator, and/or vibration damper known in the art, and in some embodiments, some of these components may not even be included.

Torque converter 10 additionally includes lockup clutch 22 for mechanically coupling a transmission input shaft (not shown) and/or output flange 23 of damper 20 to cover 12 and/or the torsional input. Piston 24 is axially moveable in the torque converter and provided for engagement of clutch 22. Retainer 26 is included to act as a carrier for the plates of clutch 22, such as plates 25. The other clutch plate shown in FIG. 1 is connected to cover plates 27 of damper 20. Connection member 28 is shown non-rotatably attaching retainer 26 to cover 12. That is, the connection member is included to transfer torque between the cover and clutch plate retainer. In FIG. 1, connection member 28 is shown particularly as an extruded rivet, although it should be understood that the connection member could take other forms, such as a bolt or the like.

Figure 2:
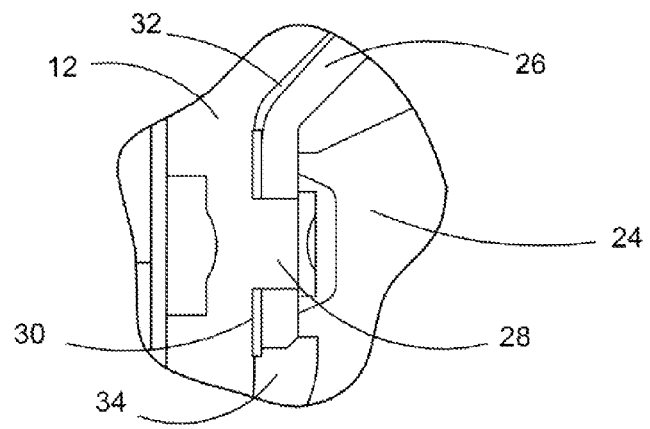

As can be seen most clearly in FIG. 2, seal 30 is provided between cover 12 and retainer 26. Seal 30 is provided because, in order for clutch 22 to operate properly, a pressure differential must be creatable between the fluid chambers on opposite sides of piston 24. That is, chamber 32 must be sealed in a fluid-tight manner from chamber 34. Chamber 32 is generally a main operating chamber for the torus of the torque converter, while chamber 34 is an apply chamber for moving the piston axially toward clutch 22 for closing the clutch. As discussed above, welding retainer 26 to cover 12 would provide a good seal, but would be very costly and may result in warping or the creation of spatter or other contaminants. If no special sealing element or process is used, then too much leakage would occur between chambers 32 and 34, and the torque converter would fail to meet the increasingly precise requirements of modern torque converter clutches.

The seal is provided as a thin, ring shaped component that surrounds connection member 28 for preventing the leakage of operating fluid, such as oil, in the generally radial direction between the retainer and the cover. In other words, the connection members extend through the seal for clamping the seal between the cover and the clutch plate retainer. The seal is formed from paper or cellulose-based clutch friction material. That is, many torque converters include clutches that include a special friction material for providing improved engagement of the clutch. One type of friction material is paper or cellulose-based, wherein the paper or cellulose is usually impregnated with a resin, such as a phenolic resin, or other bonding agent. Advantageously, this friction material is suitable for operating in the harsh environment of a torque converter. For example, unlike rubber seals, cellulose-based friction material is capable of withstanding immersion in high temperature oil without degradation. It is also capable of withstanding large compressive or axial forces. Furthermore, the cellulose-based material is known to absorb oil, which may result in a slight swelling of the seal for providing an even tighter seal between the cover and retainer. Because the material can absorb oil, there may be a very slow seepage of oil through the seal, but it would not be enough to affect the performance of the clutch. Heretofore, clutch friction material has only been used for coupling rotating components together. According to the current invention, friction material for a clutch is used as to form a fluid-tight seal between two non-rotatable components.

Other clutch friction materials would not work similarly as a seal. For example, too much leakage would occur from using carbon-based woven friction materials. Additionally, typical rubber sealing materials would not work because they can not withstand prolonged immersion in high temperature oil, and specialized seals are prohibitively expensive.

It should be understood, particularly with respect to FIG. 2, that any two components of a torque converter could be sealed according to the current invention in lieu of welding or the like. For example, the cover, turbine shell, piston, or damper components could be sealed to clutch plates, retainers, drive plates, etc., according to the current invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A torque converter comprising:
   a first component;
   a second component non-rotatably secured to said first component by a connection member, wherein:
   a seal is arranged between said first and second components;
   said connection member extends through said seal;
   said seal surrounds at least a portion of the connection member;
   said seal is made from a wet clutch friction material comprising cellulose;
   said first and second components at least partially define a first chamber and a second chamber;
   said seal separates said first chamber from said second chamber in a substantially fluid-tight seal manner;
   said first component is a cover for said torque converter and said second component is a retainer for carrying plates of a clutch; and
   said connection member is an extruded rivet.

2. The torque converter recited in claim 1, wherein said seal is impregnated by resin.

3. The torque converter recited in claim 1, wherein said first and second chambers are formed on opposite sides of a piston of said torque converter.

* * * * *